May 29, 1945.　　　　H. S. JONES　　　　2,376,920
FIRE ALARM SYSTEM
Filed June 19, 1944
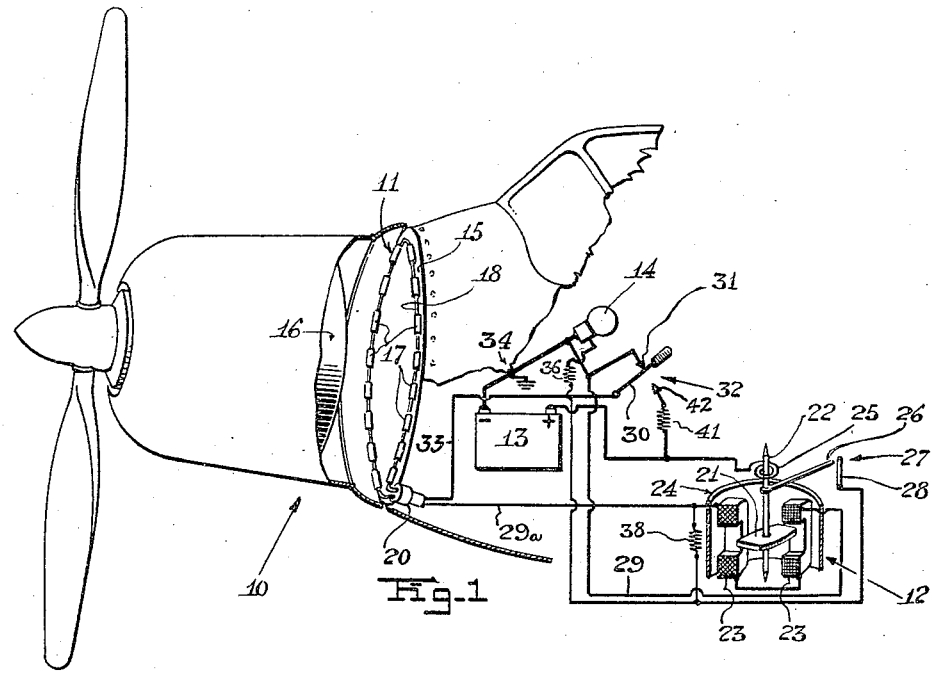
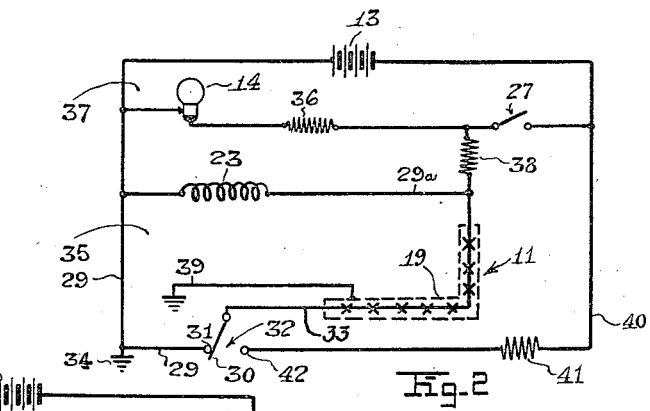
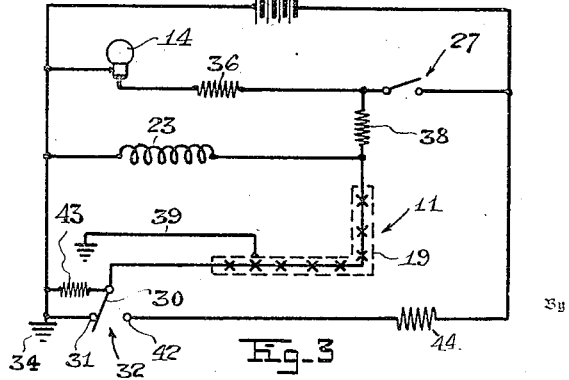
Inventor
Harry S. Jones
Henry Lanahan
Attorney Patented May 29, 1945

2,376,920

UNITED STATES PATENT OFFICE 2,376,920

FIRE ALARM SYSTEM

Harry S. Jones, East Orange, N. J., assignor to Thomas A. Edison, Incorporated, West Orange, N. J., a corporation of New Jersey Application June 19, 1944, Serial No. 540,916

17 Claims. (Cl. 177—311)

This invention relates to automatic fire alarm systems and more particularly to improvements in fire alarm systems of the thermocouple type.

My invention has been particularly adapted and applied for detecting fires on airplanes, and it is in that connection that I herein describe my invention, but no unnecessary limitation of my invention to this particular application is intended.

In airplane applications there is a tendency for the fire alarm systems to fail because of open circuits caused by the vibration of the plane. Also, in applications where the thermocouples are exposed to the weather, such as in detecting engine fires, the insulation resistance between the thermopile circuit and the casing of the thermopile will tend to be reduced, giving rise to leakage points which result in low resistance shunts across the respective thermocouples and, again, in possible failure of operation of the fire alarm system. In practice, especially in damp weather conditions, there may occur a substantial reduction in insulation resistance of the thermopile at many points. However, these leakage points are not detrimental until their effective leakage resistance reaches a prescribed threshold value below which the respective thermocouples shunted by these leakage points can no longer be relied upon for dependably initiating an alarm. It is accordingly apparent that it is not only important that fire alarm systems in applications of the character mentioned shall have provision by which they may be readily tested for open circuits and leakage resistances but that, as to the latter, the test indications shall be dependent on the magnitude of the leakage resistance so that indications of operability and inoperability on test shall be reliable and shall correspond with actual conditions in operation.

It is an object of my invention to provide an improved circuit for fire alarm systems of the character mentioned and particularly an improved such system for airplanes having provision by which it may be readily tested for operability.

It is another object to provide improved means for testing such alarm systems for operability which is simple and highly reliable.

It is another object to provide improved means for testing such fire alarm systems which will in one test operation give reliable indications both as to the presence of open circuits and effective leakage resistances.

It is another object to provide a test means for such fire alarm systems which will indicate operability or inoperability according to whether the leakage resistance in the thermopile is above or below a prescribed threshold value, and further to provide such test means which is adapted to indicate operability only when that threshold value is above the minimum value of leakage resistance permissible in actual operation by a prescribed minimum margin of safety.

It is a further object to provide improved means for testing thermocouple-type fire alarm systems wherein the threshold values of leakage resistance on test are above permissible minimum values of those resistances by a uniform margin of safety for all points of leakage along the thermopile.

It is a further object to test thermocouple-type fire alarm systems for operability by test current supplied by the potential source which is provided for actuating the alarm of the system.

It is a further object to fulfill the aforestated objectives in alarm systems wherein supplementary current is supplied to the relay from the alarm circuit of the system when the contacts of the relay are closed.

These and other objects of my invention will more fully appear from the following description and the appended claims.

In the description of my invention reference is had to the accompanying drawing, of which:

Figure 1 is a diagrammatic view of the circuits and mechanism showing the application of my invention to an airplane;

Figure 2 is a schematic circuit diagram of the alarm circuit of Figure 1; and

Figure 3 is a schematic circuit diagram of a second embodiment of my invention.

In Figure 1 there is shown a fire alarm system for detecting fires on an airplane 10 (fractionally shown). The main components of this fire alarm system comprise a thermopile 11, a sensitive meter relay 12, a battery 13 and an alarm device which may be a signal light 14. Purely by way of example, the thermopile 11 is mounted on the fire wall 15 behind the airplane engine 16 (diagrammatically shown) so that it will detect engine oil fires, but it will be understood that the thermopile may be located in any other desired place. This thermopile comprises a number of individual thermocouple units 17 connected in series at intervals by intervening cables 18. The units per se and the cables 18 are provided with a metal casing which is diagrammatically shown as 19 in Figure 2, this casing typically comprising rigid metal housings for the units and flexible armor for the cables; the thermocouples and the interconnecting wires of the cables are insulated from the casing as by ceramic material in the thermocouple units and asbestos in the cables. This casing is clamped against the fire wall 15 by suitable brackets (not shown) and connection to the thermopile is made by way of a connector block 20 extending through the fire wall. For further detailed description of a form of thermopile which is satisfactory for use with the present invention, reference may be had to the pending application of Frederick G. Kelly, Serial No. 442,759, entitled Thermopile, and having a common assignee with the present application.

The meter relay 12 which is herein preferably employed is of the moving magnet type. Such meter relay has for its armature a permanent magnet 21 mounted on a shaft 22, and has one or more field coils 23 for producing a magnetic field to exert a torque influence on the armature. Preferably, the magnet 21 comprises a bar-shaped piece of "Alnico," and there are employed two field coils mounted on diametrically opposite sides of the shaft 22. Surrounding the coils and magnet is a cylindrical magnetic shield 24, fractionally shown. The magnet is torsionally biased by a spiral spring 25 so that it normally occupies a position at angles to the axis of the coils and will be propelled from that position towards the coil axis when the coils are energized.

Carried by the shaft 22 at right angles thereto is a contact arm 26 of a switch 27 which, as the armature is propelled by the coils, impinges against a semi-stationary contact arm 28 mounted at right angles to the first contact arm. These contact arms are preferably made of thin flexible wire so that they will flex slightly under influence of the propelling torque of the armature to give a rolling contact as the arms impinge against one another, such manner of engagement of the arms being important in sensitive meter relays having small operating power for preventing sticking of the contacts.

As shown in Figure 1, one end of the relay coils 23 is connected by lead 29 to ground—i. e., to the plane structure at point 34—as is also one end of the thermopile through lead 33 and the pole member 30 and contact point 31 of a manually-operable switch 32. The other ends of the coils and thermopile are interconnected by lead 29a. Thus, there is formed a closed circuit which includes the thermopile and relay coils in series. This circuit—which is referred to as 35 in the schematic diagram of Figure 2—is herein termed the "control circuit" of the alarm system.

The negative terminal of the battery 13 is connected to the plane structure at the point 34 and is connected to one side of the lamp 14, and the positive terminal of the battery is connected through the relay switch 27 and a resistor 36 to the other side of the lamp. This circuit, which is referred to as 37 in Figure 2, is herein termed the "alarm circuit" of the system. Upon one or more of the thermocouples of the thermopile 11 being exposed to a sudden dangerously-high temperature, there will be generated a thermal voltage which will energize the coils 23 of the relay and cause the switch 27 of the relay to close. When this relay switch is closed, current is supplied to the lamp 14 from the battery 13 and a signal light or alarm is given. The function of the resistor 36 is to limit the initial high rush of current through the lamp, when the lamp is cold and its resistance consequently is low, so as to safeguard the contact points of the relay from unnecessary wear.

To assure that the switch of the relay will close positively once the arms 26 and 28 momentarily contact each other, and that the relay switch will stay closed under heavy vibration so long as a normal operating level of current is supplied to the coils of the relay, supplementary current is supplied to the relay coils from the battery 13 upon closure of the relay switch. The circuit of this supplementary current is from the positive terminal of the battery 13 through the contact arms 26 and 28, a resistor 38, coils 23, and the lead 29 to the ground point 34 and the negative terminal of the battery. The resistor 38 is provided for the purpose of limiting the supplementary current to such appropriate level that when the thermal current of the thermopile falls to a predetermined level, the spring 25 will overcome the torque exerted by the coils on the magnet 21 and will cause the relay switch to open. For a typical battery potential of 14 volts, an appropriate value for resistor 38 is 10,000 ohms.

In thermocouple-type fire alarm systems the relay is required to close in response to very little power input in view of the small voltage which thermocouples are capable of generating and the practical need for an alarm to be given when only a single thermocouple is exposed to a sudden dangerously-high temperature. The thermal voltage of thermocouples varies with the temperature differential between their hot and cold junctions. Typically, the maximum thermal voltage which a thermocouple can generate is of the order of 40 mv., but this maximum voltage is obtained only when the thermocouple is exposed to such intense heat that it is just short of being destroyed. As a practical matter, the alarm system must be designed to sound an alarm when a much lower value of thermal voltage is generated in the thermopile. By way of preferred example, the coils 23 may have approximately 3 ohms and be adapted to operate the relay contacts in response to 3 ma. of current; the thermopile may comprise twenty-seven thermocouples in series of which each may have approximately .07 ohm, giving a total resistance of approximately 1.9 ohms. For these values, the relay will close in response to slightly less than 15 mv. of thermal voltage from the thermopile—which is a prescribed suitable value for a dependably-operating alarm system.

When leakage points develop between the thermocouple circuit and the casing 19 of the thermopile, shunt circuits are created across the respective thermocouples by way of the ground connection of the casing 19 to the plane structure, indicated by 39 in Figure 2. As a result, part of the thermal voltage of the thermocouples is depleted through these shunt circuits and a greater thermal voltage is therefore required in order to initiate an alarm. The very minimum values of resistance which these leakage points may have while yet maintaining an operable system may be prescribed on the basis of the maximum thermal voltage which the respective thermocouples can generate. Considering, for instance, this maximum voltage to be 40 mv., and that one end of the thermopile is grounded as above described, a leakage point between the first and second thermocouples at the grounded end of the thermopile may have a resistance as low as a fraction of .1 ohm; on the other hand, the minimum permissible resistances of leakage points located between higher-numbered thermocouples are successively higher, the minimum value at the extreme other end of the thermopile for a yet operable system being approximately .7 ohm.

On testing a fire alarm system, it is desired that operability shall not be indicated for leakage resistances in the thermopile as low as the above prescribed minimum values but only for leakage resistances which are above a threshold value that is higher than these minimum values by a prescribed minimum margin of safety. In other words, it is important that operability shall not be indicated by the presence of leakage points having the minimum permissible values of leakage resistance, and it is equally important that inoperability shall not be indicated by leakage resistances which are substantially greater than the permissible minimum values by a suitable margin of safety. It is found that thermopiles of fire alarm systems may be tested reliably in one operation for both continuity and leakage resistance and that, as to the latter, the test can be made to indicate operability and inoperability according to whether the effective leakage resistance is above or below the desired threshold abovementioned—which threshold is a minimum value of leakage resistance above which the system is considered dependable in actual operation. To obtain this correspondence on test with conditions in actual operation, it is found to be a basic requirement that the control circuit 35 be connected to ground through substantially negligible resistance or, at most, through a resistance not substantially greater than that of the thermopile. It will be observed that this limitation prescribes that the resistor 38 of the supplementary-current circuit shall be connected between the control and alarm circuits from the side of the coils 23 which is opposite to ground, this being the location of the resistor as above described.

By the present invention, the alarm system is tested simply by supplying current of predetermined value from the battery 13 through the thermopile 11 and coils 23 in series, with the coils being connected between the thermopile and ground. This is accomplished by a circuit 40 serially including a current-limiting resistor 41 and connected from the ungrounded side of the battery 13 to a contact point 42 of the manually-operable switch 32. When the pole member 30 of this switch 32 is thrown from its normal or "run" position—the position it occupies in the figures—to "test" position wherein it makes connection with the contact point 42, the battery 13 and resistor 41 are serially interposed in the control circuit between the thermopile and ground and test current is supplied through the thermopile and coils 23 in series. The value of this test current is chosen so that when the effective leakage resistances are above and below the desired threshold value abovementioned, the system will test "operable" and "inoperable" respectively. After many experiments and field tests, it has been found that a preferred threshold value of leakage resistance for the present illustrative example of my invention is between 1 and 2 ohms; also, it is found that upon supplying a test current of the order of 11 ma. the threshold value on test falls within this desired range. For instance, with this value of test current, the system will test "operable" and "inoperable" respectively when the leakage resistance is above and below approximately 1.8 ohms for leakage points at the end of the thermopile next to ground and 1.2 ohms for leakage points at the other end of the thermopile. For a battery potential of 14 volts, the resistor 41 has therefore approximately 1250 ohms.

In Figure 3 I provide a modified test circuit which is differentially sensitive to the magnitude of leakage resistances at different points along the thermopile in the same way that the system is sensitive in actual operation to the magnitude of such differently-located points of leakage resistance. This test circuit includes a resistor 43 connected from the pole 30 of switch 32 to ground. When the switch 32 is in "run" position, resistor 43 is shorted and has no effect in the circuit; but when the switch 32 is thrown to "test" position, this resistor is connected serially with a resistor 44, corresponding to the resistor 41 of Figure 2, to form a potentiometer. The function of this potentiometer is to provide the thermopile and coil in series with a source of current supply having a low internal resistance—preferably a resistance less than that of the thermopile in the particular cited example. By way of illustration, the resistor 43 may have .5 ohm, and approximately 80 ma. current may be drawn from the battery 13 through the resistor 44, in which case the resistor 44 will have approximately 175 ohms. Under these conditions, the threshold value of leakage resistance at the end of the thermopile nearest to ground below and above which the system will test as being inoperable and operable respectively is approximately .3 ohm and that for leakage points at the other end of the thermopile is approximately .9 ohm. The minimum permissible leakage resistances at these points, as aforementioned, are a fraction of .1 ohm and approximately .7 ohm respectively. Accordingly, with this modified test circuit the threshold resistances on test are above the respective permissible minimum values by approximately the same margin of safety irrespective of the location of the leakage points along the thermopile, this margin being in the particular instance approximately .2 ohm. Of course, other uniform margins of safety may be prescribed by choosing suitably different values of resistances 43 and 44. Since this test circuit indicates by a substantially uniform margin of safety, a wholly reliable indication is always obtained and more effective use of the alarm system is assured.

While I have herein shown and described my invention in terms of several specific embodiments, it will be understood that these embodiments are illustrative and not limitative of my invention and are subject to changes and modifications within the range of engineering skill without departure from the scope of my invention, which I endeavor to express according to the following claims.

I claim:

1. In a fire alarm system including a thermopile, a relay controlled by said thermopile and an alarm circuit controlled by said relay and including a source of potential, said source of potential having connection to ground: the combination of a control circuit serially including said thermopile and a coil of said relay; and means for testing said system for operability including a switch in said control circuit for connecting said source of potential to said thermopile and coil in series, with said coil being connected between the thermopile and ground.

2. In a fire alarm system including a thermopile, a relay controlled by said thermopile and an alarm circuit controlled by said relay and including a source of potential, said source of potential having one side thereof connected to ground: the combination of a control circuit serially including said thermopile and a coil of said relay, said coil being connected at one end thereof to ground; and means for testing said system for operability including switch means for connecting said source of potential to said thermopile and coil in series, with said coil being connected between said thermopile and ground.

3. In a fire alarm system including a thermopile, a relay controlled by said thermopile and an alarm circuit controlled by said relay and including a source of potential, said source of potential having connection to ground: the combination of a control circuit serially including said thermopile and a coil of said relay; support means for said thermopile having connection to ground; and means for testing said system for operability, including testing said thermopile in one operation both for continuity and for leakage to ground, comprising switch means serially included in said control circuit and operable to open said circuit and connect said thermopile and coil to said potential source in series, with said coil being connected between the thermopile and ground.

4. In a fire alarm system including a thermopile, a relay controlled by said thermopile and an alarm circuit controlled by said relay and including a source of potential, said source of potential having one side thereof connected to ground: the combination of a control circuit serially including said thermopile and a coil of said relay, said coil being connected at one end thereof to ground through a resistance at most not substantially greater than the resistance of said coil and thermopile in series; support means for said thermopile having connection to ground; and means for testing said system for operability, including testing said thermopile for continuity and for leakage resistance to ground, comprising means for supplying current from said source of potential through said thermopile and coil in series, with said coil being connected between said thermopile and ground.

5. In a fire alarm system including a thermopile, a relay controlled by said thermopile and an alarm circuit controlled by said relay and including a source of potential, said source of potential having one side thereof connected to ground: the combination of a control circuit serially including said thermopile and a coil of said relay, said coil being connected at one end thereof to ground, the resistance of said connection being not greater than the resistance of said coil and thermopile in series; a metal casing insulatedly carrying said thermopile and having connection to ground; and means for testing said system for operability, including testing said thermopile for continuity and for leakage resistance to ground, comprising circuit means including said source of potential for supplying current, within a predetermined range of magnitude, through said thermopile and coil, with said coil being connected between said thermopile and ground.

6. In a fire alarm system including a thermopile, a relay controlled by said thermopile and an alarm circuit controlled by said relay and including a source of potential, said source of potential having one side thereof connected to ground: the combination of a control circuit serially including said thermopile and a coil of said relay, one end of said coil having connection to ground and the resistance of said connection being not greater than the resistance of said coil and thermopile in series; a support means for said thermopile having connection to ground; and means for testing said system for operability, including testing said thermopile for continuity and for leakage resistance to ground, comprising a current-limiting resistor of predetermined value and means for connecting said potential source through said resistor to said thermopile and coil in series, the said coil being connected between the thermopile and ground.

7. In a fire alarm system including a thermopile, a relay controlled by said thermopile and an alarm circuit controlled by said relay and including a source of potential, said source of potential having one side thereof connected to ground: the combination of a control circuit serially including said thermopile and a coil of said relay, one end of said coil having permanent connection to ground; support means for said thermopile having connection to ground; a test circuit connected to said source of potential and serially including a current-limiting resistor; and a single-pole two-position switch selectively operable for closing said control circuit or for opening said control circuit and serially connecting said thermopile and coil in said test circuit, with said coil being connected between the thermopile and ground.

8. In a fire alarm system including a thermopile, a relay controlled by said thermopile and an alarm circuit controlled by said relay and including a source of potential, said source of potential having one side thereof connected to ground: the combination of a support for said thermopile having connection to ground; a control circuit serially including said thermopile and a coil of said relay, said circuit being connected to ground at a junction thereof between said coil and said thermopile, said thermopile including a thermocouple capable of generating a thermal voltage sufficient to actuate said relay provided the leakage resistance of the thermopile to ground across said thermocouple is above a predetermined threshold value; and means including said potential source for supplying test current through said thermopile and coil, with the coil being connected between the thermopile and ground, said means being adapted to supply a predetermined value of current such as will actuate said relay only when the leakage resistance across said thermocouple to ground is at least of the order of said threshold value.

9. In a fire alarm system including a thermopile, a relay controlled by said thermopile and an alarm circuit controlled by said relay and including a source of potential, said source of potential having one side thereof connected to ground: the combination of a support for said thermopile having connection to ground; a control circuit serially including said thermopile and a coil of said relay, said circuit being connected to ground at one end of said coil, said thermopile comprising a plurality of serially connected thermocouples each capable of generating a thermal voltage sufficient to actuate said relay provided the leakage resistances of the thermopile to ground across the respective thermocouples are above respective threshold values; and means including said source of potential for supplying test current through said thermopile and coil, with the coil being connected between the thermopile and ground, the value of said test current being predeterminately selected so that actuation of said relay will occur on test only when the leakage resistance of said thermopile to ground is above the maximum of said threshold values.

10. In a fire alarm system including a thermopile, a relay including a coil and a pair of contacts, and an alarm circuit serially including said contacts, an alarm device, and a source of potential, said source having connection to ground: the combination of a control circuit serially including said coil and thermopile, one side of said coil having connection to ground; circuit means for supplying supplementary current from said alarm circuit through said coil to ground upon closure of said contacts, said circuit means including a current-limiting resistance connected between the side of said coil opposite to ground and said alarm circuit; and means for testing said system for operability, including testing said thermopile for continuity and leakage resistance to ground, comprising means selectively controllable for supplying current from said potential source through said thermopile and coil in series, with said coil being connected between the thermopile and ground.

11. In an alarm system for detecting fires on airplanes comprising a thermocouple provided with a metallic casing and adapted for mounting on the structure of an airplane, a relay controlled by said thermopile, and an alarm circuit including a battery having one side thereof connected to said plane structure: the combination of a control circuit serially including said thermopile and a coil of said relay, said control circuit being connected to said plane structure at one end of said coil; and means for testing said system for operability, including testing said thermopile for continuity and leakage resistance to said plane structure, comprising means for supplying current from said battery through said thermopile and coil in series, with said coil being connected between the thermopile and the plane structure.

12. In an alarm system for detecting fires on airplanes, comprising a thermopile having a metallic casing on and grounded to the structure of the airplane, a relay comprising a coil and a pair of contacts, and an alarm circuit including a battery having one side thereof grounded to said plane structure and further including said contacts and an alarm device, said alarm device being connected between the grounded side of said battery and said contacts: the combination of a control circuit serially including said thermopile and coil, said circuit being grounded at one side of said coil to said plane structure; means for supplying supplementary current to said coil upon closure of said contacts, including a resistor connecting the other side of said coil to a point in said alarm circuit between said contacts and alarm device; and circuit means for supplying test current from said battery through said thermopile and coil in series, with the coil being connected between the thermopile and plane structure, said circuit means including a resistor for limiting the test current so that the system will operate on test only when the leakage resistance of the thermopile to the plane structure is greater than that which would cause a failure of the system to operate in normal use.

13. In an alarm system for detecting fires on airplanes, comprising a thermopile having a metallic casing mounted on and grounded to the structure of the airplane, a relay comprising a coil and a pair of contacts, and an alarm circuit including said contacts, an alarm device and a battery grounded to said plane structure, said alarm device being connected between the grounded side of said battery and said contacts: the combination of a control circuit serially including said thermopile and coil and having ground connection at one side of said coil to said plane structure; and means for supplying supplementary current to said coil upon closure of said contacts comprising a circuit connecting said coil in parallel relation to said alarm device, said circuit including a current-limiting resistor connected between the other side of said coil and said alarm circuit.

14. In a fire alarm system including a thermopile, a relay controlled by said thermopile and an alarm circuit controlled by said relay and including a source of potential, said source of potential having connection to ground: the combination of a control circuit serially including said thermopile and a coil of said relay; and circuit means for supplying test current from said potential source through said thermopile and coil in series, with the coil being connected between the thermopile and ground, whereby to test the system for operability, said circuit means including a potentiometer for limiting the test current through said thermopile and coil.

15. The combination set forth in claim 14 wherein said potentiometer provides a source of current supply to said thermopile and coil having an internal resistance substantially less than the resistance of said thermopile.

16. The combination set forth in claim 14 wherein said potentiometer provides a source of potential, for supplying current to said thermopile and coil in series, having a voltage equal approximately to the generated thermovoltage of the respective thermocouples of said thermopile.

17. In a fire alarm system including a thermopile, a relay controlled by said thermopile and an alarm circuit controlled by said relay and including a source of potential, said source of potential having connection to ground: the combination of a control circuit serially including said thermopile and coil, said circuit being connected at one side of said coil to ground; a resistance in said control circuit between ground and said thermopile; a resistance serially connected to the ungrounded side of said source of potential; and switch means having one position for shorting said first-mentioned resistance and another position for connecting the junction point between said first-mentioned resistance and thermopile to said second-mentioned resistance.

HARRY S. JONES.